US008336050B2

(12) United States Patent (10) Patent No.: US 8,336,050 B2
Dake (45) Date of Patent: Dec. 18, 2012

(54) SHARED MEMORY INTER-PROCESS COMMUNICATION OF VIRTUAL MACHINES USING VIRTUAL SYNCHRONY

(75) Inventor: Steven Dake, Flagstaff, AZ (US)

(73) Assignee: Red Hat, Inc., Raleigh, NC (US)

( * ) Notice: Subject to any disclaimer, the term of this patent is extended or adjusted under 35 U.S.C. 154(b) by 538 days.

(21) Appl. No.: 12/551,314

(22) Filed: Aug. 31, 2009

(65) Prior Publication Data

US 2011/0055829 A1 Mar. 3, 2011

(51) Int. Cl.
*G06F 9/455* (2006.01)
*G06F 13/00* (2006.01)
(52) U.S. Cl. ............................................. 718/1; 711/147
(58) Field of Classification Search ......................... None
See application file for complete search history.

(56) References Cited

U.S. PATENT DOCUMENTS

| | | | |
|---|---|---|---|
| 7,788,522 B1* | 8/2010 | Abdelaziz et al. | 714/4.1 |
| 2002/0144010 A1* | 10/2002 | Younis et al. | 709/314 |
| 2006/0123203 A1* | 6/2006 | Suzuki | 711/152 |
| 2006/0130063 A1* | 6/2006 | Kilian et al. | 718/100 |
| 2007/0113039 A1* | 5/2007 | Madhavarao et al. | 711/170 |
| 2008/0046885 A1* | 2/2008 | Shultz et al. | 718/1 |
| 2009/0327552 A1* | 12/2009 | Sundaram et al. | 710/260 |
| 2010/0161911 A1* | 6/2010 | Li et al. | 711/147 |
| 2010/0217916 A1* | 8/2010 | Gao et al. | 711/6 |

OTHER PUBLICATIONS

Amir et al., "The Totem Single-Ring Ordering and Membership Protocol", pp. 1-29, University of California, Santa Barbara.
Moser et al., "Extended Virtual Synchrony", pp. 1-20, University of California, Santa Barbara, copyrighted 1994.
Wikipedia, "Virtual Synchrony", http://en.wikipedia.org/wiki/Virtual_synchrony, Jun. 30, 2009, pp. 1-9.
Dake, "Inside Virtual Synchrony", devresources.linux-foundation. org/.../openais-presentation-072005-1st.pdf, Jul. 12, 2005, pp. 1-17.

* cited by examiner

*Primary Examiner* — Meng An
*Assistant Examiner* — Benjamin Wu
(74) *Attorney, Agent, or Firm* — Lowenstein Sandler PC

(57) ABSTRACT

A mechanism for virtual synchrony total order messaging for virtual machines is disclosed. A method of embodiments of the invention includes receiving a request to reserve a block of memory in a shared memory segment, reserving the block of memory, and providing a start address of the reserved block of memory to a virtual machine (VM) that sent the request in order for the VM to copy a message from an application of the VM into the reserved block of memory, wherein the application communicates with other applications on other VMs using virtual synchrony. The method may further include sending a new message available request to all of the other VMs, wherein the new message available request includes the start address of the reserved block of memory and a length of the message, and tracking the VMs that access the reserved block of memory.

18 Claims, 4 Drawing Sheets

US 8,336,050 B2

SHARED MEMORY INTER-PROCESS COMMUNICATION OF VIRTUAL MACHINES USING VIRTUAL SYNCHRONY

TECHNICAL FIELD

The embodiments of the invention relate generally to virtual machine systems and, more specifically, relate to a mechanism for virtual synchrony total order messaging for virtual machines.

BACKGROUND

Virtual synchrony is used in group communication systems for interprocess message passing. Virtual synchrony allows programs running in a network to organize themselves into process groups and to send messages to groups (as opposed to sending the messages to specific processes). Total order messaging is one property of virtual synchrony where each message is delivered to all the group members in the identical order, and this is true even when two messages are transmitted simultaneously by different senders. This allows every group member to see the same events in the same order.

Virtual synchrony, and more specifically total order messaging, can be a very useful feature for processes running in cluster environments. A virtual machine (VM) is one such example of a cluster environment. A VM environment includes a host machine (e.g., computer or server) that is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. A hypervisor of the host machine virtualizes the underlying hardware of the host machine or emulates hardware devices, making the use of the VM transparent to the guest operating system or the local or remote client that uses the VM.

Unfortunately, all total ordering protocols used today require a multicast mechanism and, as a result, perform poorly in VM environments. In some VM environment there could be a host machine with multiple processors hosting multiple VMs, for instance up to the thousands of VMs.

The protocols that exist today for virtual synchrony total order messaging for clustering are not capable or efficient enough to scale to thousands of VMs that may be virtualized by a host machine. One such existing protocol is the totem protocol, which provides total order messaging among a collection of machines. There are also other protocols that also provide total order and membership guarantees for collections of machines. However, none of these systems provide an optimized protocol for virtual synchrony messaging within VMs.

As such, there is a need for a virtual synchrony total order messaging model that today's technology cannot provide. A mechanism to improve performance by custom designing a virtual synchrony total ordering system which matches the underlying architecture of VMs would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
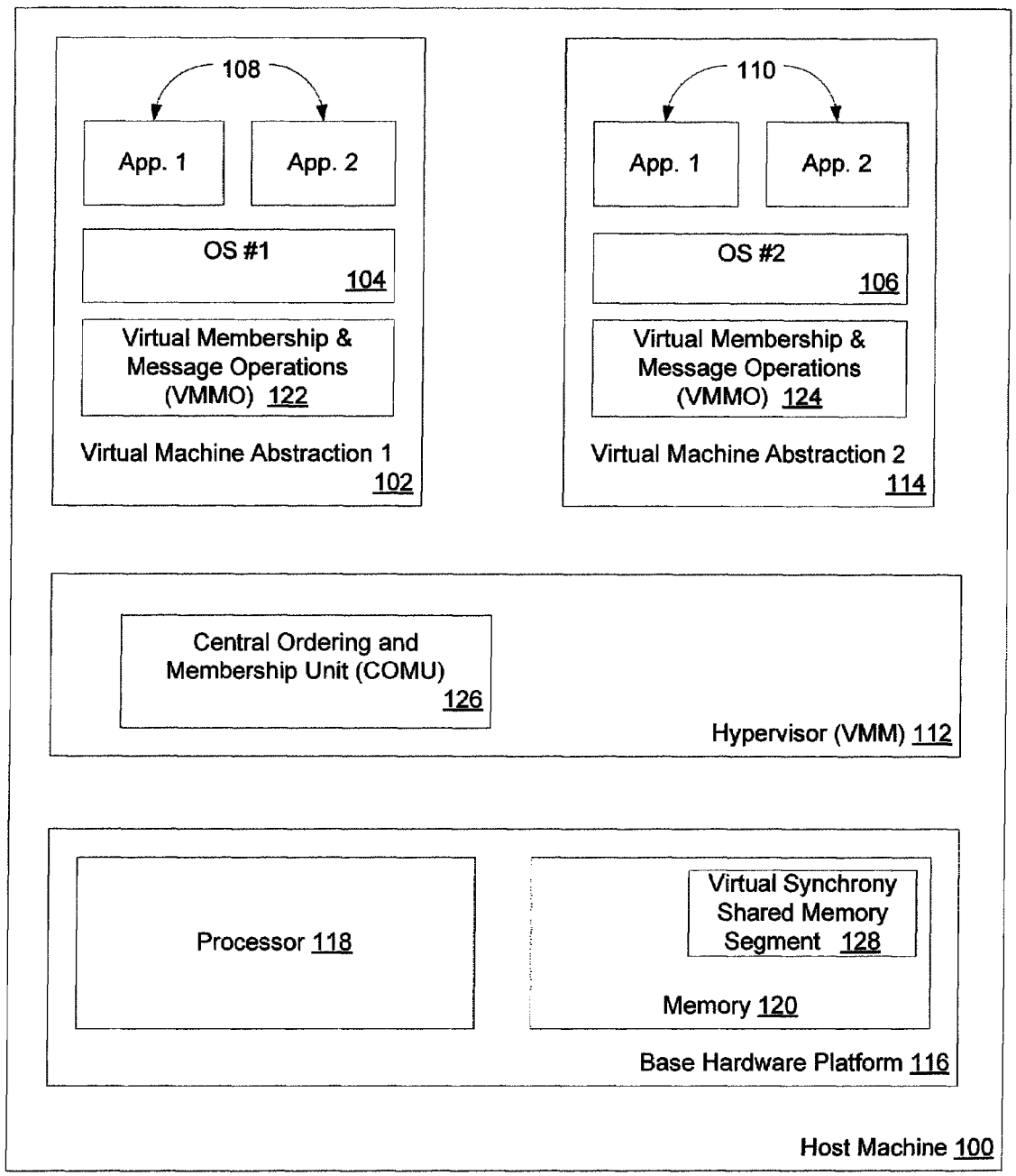
FIG. 1 is a block diagram of a host machine to perform embodiments of the total order messaging for VMs according to an embodiment of the invention.

Embodiments of the invention provide a mechanism for virtual synchrony total order messaging for virtual machines. A method of embodiments of the invention includes receiving a request to reserve a block of memory in a shared memory segment of a host machine, reserving the block of memory, and providing a start address of the reserved block of memory to a VM of the host machine that sent the request in order for the VM to copy a message from an application of the VM into the reserved block of memory, wherein the application communicates with other applications on other VMs managed by the host machine using virtual synchrony. Next, a new message available request is sent to all of the other VMs, wherein the new message available request includes the start address of the reserved block of memory and a length of the message. Further, the VMs that access the reserved block of memory are tracked.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for total order messaging for virtual machines. The total ordering of messages is also known as virtual synchrony. Virtual synchrony is achieved by embodiments of the invention by implementing a central ordering mechanism within a hypervisor of a host machine hosting several VMs. Each VM also includes a virtual synchrony component that communicates with the central ordering mechanism. The central ordering mechanism and the VM virtual synchrony component have access to a shared memory segment that is utilized as a central message storing location. The end result is a high performance and highly-scalable virtualization system implementing virtual synchrony total ordering of messages.

FIG. 1 illustrates a block diagram of a host machine 100 to perform embodiments of the total order messaging for VMs according to an embodiment of the invention. Host machine 100 includes a base platform hardware 116 comprises a computing platform, which may be capable, for example, of executing a standard operating system (OS) or a hypervisor 112. In some embodiments, hypervisor 112 may also be referred to as a hypervisor, a kernel-based hypervisor (e.g., Kernel-based VM (KVM)), or a host OS. In some embodiments, base hardware platform 116 may include a processor 118, memory devices 120, network devices, drivers, and so on. Hypervisor 112 virtualizes these physical resources of the base hardware platform 116 of host machine 100 for one or more VMs 102, 114. Embodiments of the invention encompass host machine 100 being capable of hosting many VMs simultaneously, and the two VMs 102, 114 are only shown in FIG. 1 for purposes of clarity and ease of explanation.

In one embodiment, each VM 102, 114 includes a guest operating system (OS), such as guest OS 104 or 106, and various guest software applications 108-110. In one embodiment, applications 108, 100 may cooperate as part of a virtual synchrony total order messaging system. This means that host machine 100 implements a protocol to replicate data between applications 108, 110 running on VMs 102, 114. In one embodiment, applications 108, 100 are the kinds of applications that would need a virtual synchrony model, such as multi-user role-playing games, air traffic control systems, stock exchanges, and telecommunications switches, to name a few examples.

In embodiments of the invention, to implement virtual synchrony in the virtualized environment provided by host machine 100, some key virtual synchrony components are put into operation on host machine 100. First, a central ordering and membership unit (COMU) 126 is run in the context of the host's hypervisor 112. In some embodiments, the COMU 126 may be referred to as "dom0" or "privileged host". Second, a per-VM service is run that provides virtual membership and message operations (VMMO) 122, 124. Lastly, a shared memory segment 128 is implemented between and available to all of the interested VMMOs 122, 124 and the COMU 126. In one embodiment, the shared memory segment 128 is a circular ring buffer. Other memory allocation techniques may also be utilized for implementing the shared memory segment 128 in embodiments of the invention.

As a result, the integration of the above virtual synchrony components provide a central ordering mechanism (i.e., COMU 126) in the hypervisor 112 that is connected to all VMs in the host machine 100 via a global shared memory segment 128. This integration allows large virtualization environments to reach high levels of scale for virtual synchrony.

Utilizing the above described virtual synchrony components, scalable total order messaging may be achieved by host machine 100. In one embodiment, when an application 108, 110 in a VM 102, 114 makes a request to send a new message to the application cluster, it sends a request to the VMMO 122, 124 of the VM 102, 114 hosting the application 108, 110. The VMMO 122, 124, in turn, sends an allocation request to the COMU 126 requesting to send a message of a specified size. The COMU 126 then responds with either a response of BUSY (indicating no buffer space is available) or a response with a start address in the shared memory segment 128 where a new message may be stored. The VMMO 122, 124 then copies the contents of the message into the shared memory segment 128 at the start address.

After the VMMO 122, 124 has copied the contents of the message into the shared memory segment 128, the VMMO 122, 124 indicates to the COMU 126 that a new message is available for delivery to the other VMMOs 122, 124. For instance, if VMMO 122 originates the message, then it will indicate to the COMU 126 that the new message is available for delivery to VMMO 124. The COMU 126 then communicates the start address of the new message to every VMMO 122, 124. The start address remains locked from further use until every VMMO 122, 124 has responded that the message was delivered, or that the VMMO 122, 124 that is still locking the address in memory has been deemed as failed.

In one embodiment, the VMMOs 122, 124 may be thought of as virtual servers within the VMs 102, 114, whose purpose is to deliver messages to the client applications 108, 110, send messages to the COMU 126 for ordering, read messages from the COMU that it gets through the shared memory segment 128, and deliver these messages back to the application 108, 110. On the other hand, the COMU 126 never sees a message itself from the applications 108, 110. It is only responsible for allocating data in the shared memory segment 128 and telling each of the VMMOs 122, 124 that there are new messages available. The COMU 126 also keeps track of the shared memory segment 128 and delivers the address spaces that need to be delivered for messages to the VMMOs 122, 124.

Operating together with the COMU 126 and VMMOs 122, 124, the shared memory segment 128 is one single large memory space that each VM 102, 114 can see a copy of. The shared memory segment 128 is used for performance purposes, so that the host machine 100 does not have to use networking between each of the VMs. This is where the scalability of embodiments of the invention is achieved. When a message is copied into the buffer of the shared memory segment 128, there is no copying being done inside the kernel of the host machine 100. Instead, the message is available and mapped into virtual memory address space of the application 108, 110. This, in turn, provides better performance by avoiding multiple copies, such as having to make 1,000 copies on a 1,000 VM host machine 100, which would create serious bandwidth problems.

In one embodiment, the COMU 126 maintains membership information regarding which nodes (i.e., VMMOs 122, 124) are available. In this embodiment, each VMMO 122, 124 sends a health-check message at a configurable time interval. If the COMU 126 does not receive a health-check message in a configured time interval, a membership event is generated by the COMU 126. The COMU 126 copies a membership message into the shared memory segment 128 and sends a message to every VMMO 122,124 on the host machine 100 that a new membership message is available. Each VMMO 122, 124 then processes the membership message similar to the processing of a regular message as described above.

In embodiments of the invention, the COMU 126 is further responsible for all allocation and garbage collection on the shared memory segment 128. The COMU 126 keeps a reference count of all buffers in use in the shared memory segment 128. A request for allocation sets the reference count to the number of currently active VMMOs 122, 24. If a VMMO fails, for instance by failing to health check in a specific interval, that VMMO's 122, 124 reference count is released automatically by the COMU 126. When a VMMO 122, 124 delivers a message, it sends a "message delivered" response to the COMU 126, which then reduces the reference count by 1 on the memory block within the shared memory segment 128. Once all references are set to zero, the memory block is available for allocation again. Furthermore, any garbage collected and added to the shared memory segment 128 may be allocated by the COMU 126.

In further embodiments of the invention, the COMU 126 must deliver messages in the same order to all VMMOs 122, 124. To achieve this, ordering requirements are set on the delivery of messages from the COMU 126 to the VMMOs 122, 124 indicating a new message segment is available. When COMU sends request to VMMO, it goes to all VMMOs at the same time (indicated message start address and length). By sending a message availability notice it to all VMMOs 122, 124 at the same time, each VMMO 122, 124 will have the same order of messages being delivered, which inherently maintains ordering.

Figure 2:
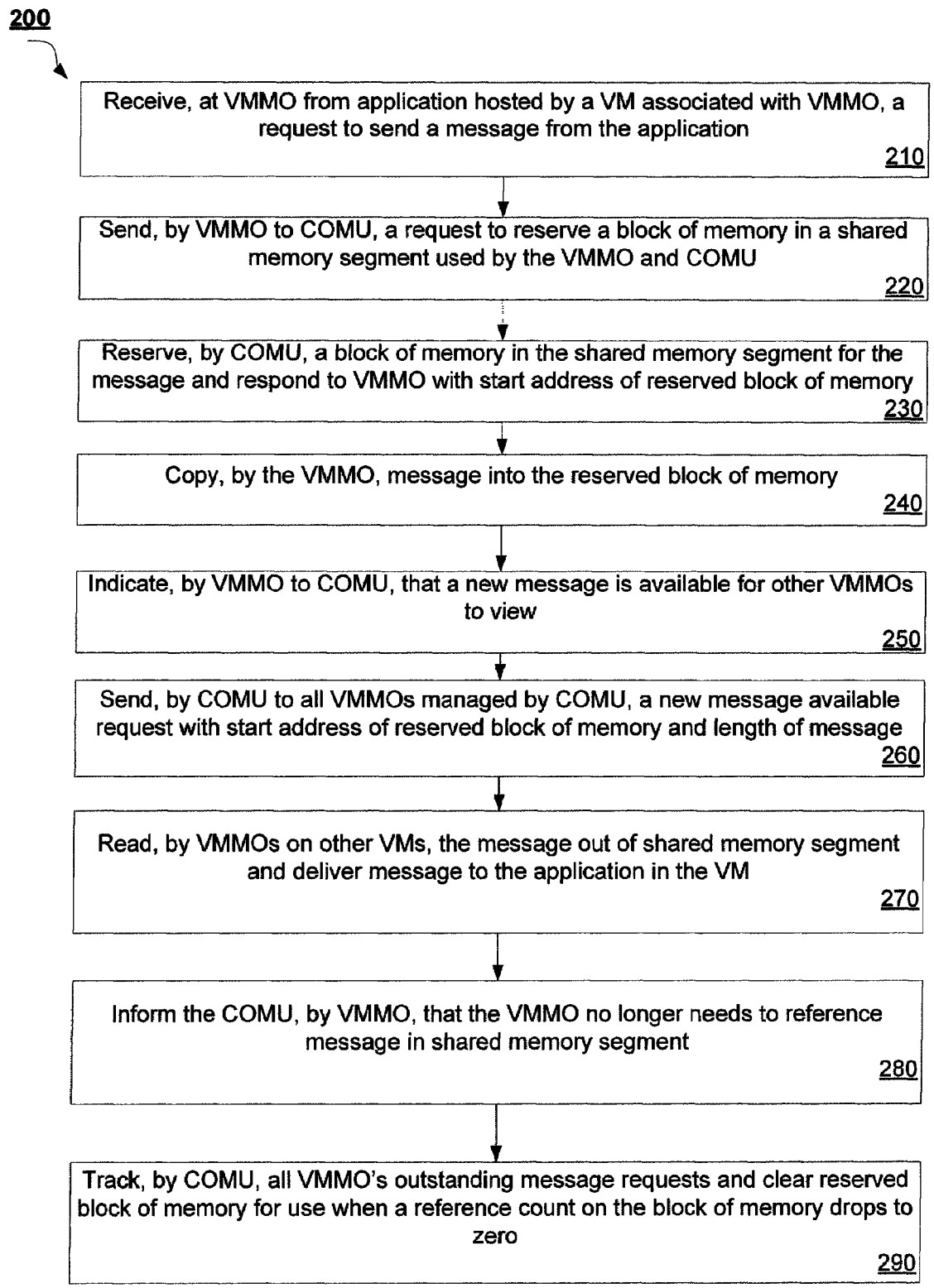
FIG. 2 is a flow diagram illustrating a method for total order messaging for VMs according to an embodiment of the invention.

FIG. 2 is a flow diagram illustrating a method 200 for total order messaging for VMs according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host machine 100 described with respect to FIG. 1.

Method 200 begins at block 210 where a VMMO receives a request from an application to send a message from the application. The application is hosted by a VM that is associated with the VMMO. Furthermore, the application is part of a group of applications that pass messages using a virtual synchrony model. At block 200, the VMMO sends a request to a COMU to reserve a block of memory in a shared memory segment used by the VMMO and the COMU. The COMU is hosted by a hypervisor that virtualizes the VM on a host machine and the shared memory segment is also part of the memory of the host machine. In one embodiment, the request is for a block of memory that is equal to the size of the message that the application want to send.

At block 230, the COMU reserves the block of memory in the shared memory segment and responds to the VMMO with a start address of the reserved block of memory. Subsequently, at block 240, the VMMO copies the message into the reserved block of memory in the shared memory segment. At block 250, the VMMO indicates to the COMU that a new message is available for all other VMMOs in a cluster of the VMMO to view.

The COMU then sends a new message available request to all other VMMOs in the cluster at block 260. The new message available request includes the start address of the reserved block of memory and the length of the message. At block 270, the VMMOs on the other VMs read the message out of the reserved block of memory and deliver the message to the related application on the VM. At block 280, the VMMOs each inform the COMU when they no longer need to reference the reserved block of memory with the message in the shared memory segment.

Lastly, the COMU tracks the VMMOs operating with outstanding requests to view messages in reserved blocks of memory in the shared memory segment at block 290. Specifically, the COMU keeps a reference count on each memory segment in the shared memory. When this reference count drops to zero, then the COMU may clear that memory space for other use. In some embodiments, if a VMMO fails before it has accessed a reserved block of memory in the shared memory segment, then the COMU will reduce any reference count for the reserved block of memory by one.

Figure 3:
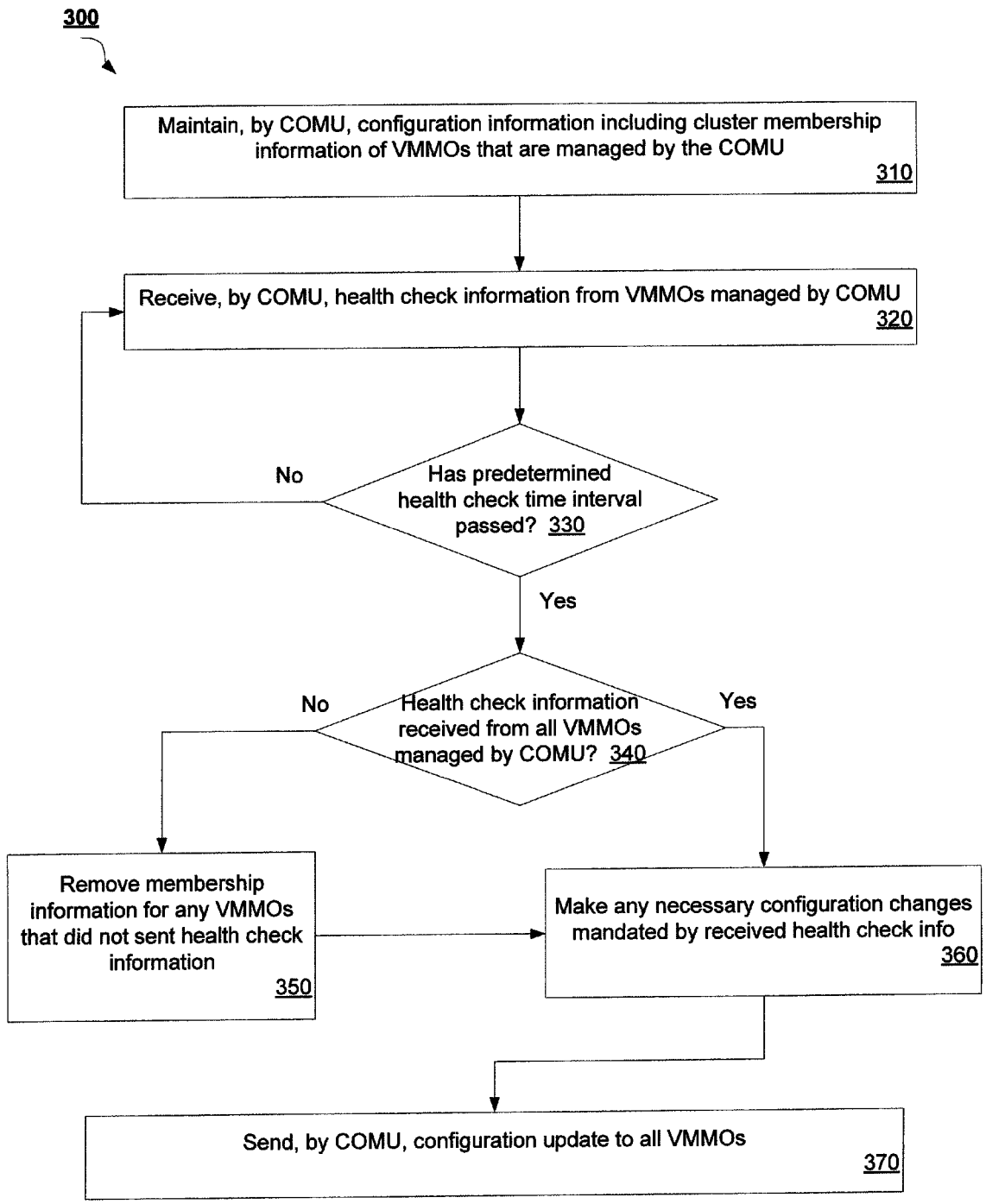
FIG. 3 is a flow diagram illustrating a method for sharing configuration information related to total order messaging for VMs according to an embodiment of the invention.

FIG. 3 is a flow diagram illustrating a method 300 for sharing configuration information related to total order messaging for VMs according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by host machine 100 of FIG. 1.

Method 300 begins at block 310 where a COMU maintains configuration information including cluster membership information of VMMOs managed by the COMU. This configuration information is important as it is used to make decisions about distribution information for total order messaging performed by the host machine of the COMU. Specifically, membership information is important to performing any virtual synchrony operations.

At block 320, the COMU receives health check information from VMMOs managed by the COMU. It is then determined whether a predetermined health check time interval has passed at the COMU at decision block 330. If not, the method 300 returns to block 320 to continue receiving health check information from the VMMOs. However, if the predetermined health check time interval has passed, then at decision block 340 it is determined whether health check information was received from all of the VMMOs managed by the COMU.

If the health check information is received from all VMMOs, then the method 300 proceeds to block 360 where any necessary configuration changes are made to the configuration info as necessitated by the received health check information. On the other hand, if it is determined that one or more VMMOs did not send health check information, then, at block 350, membership information for those VMMOs is removed. Then, the method 300 proceeds to block 360 as described above. Lastly, at block 370, the COMU sends a configuration update to all VMMOs managed by the COMU reflecting the changes made to the configuration information.

Figure 4:
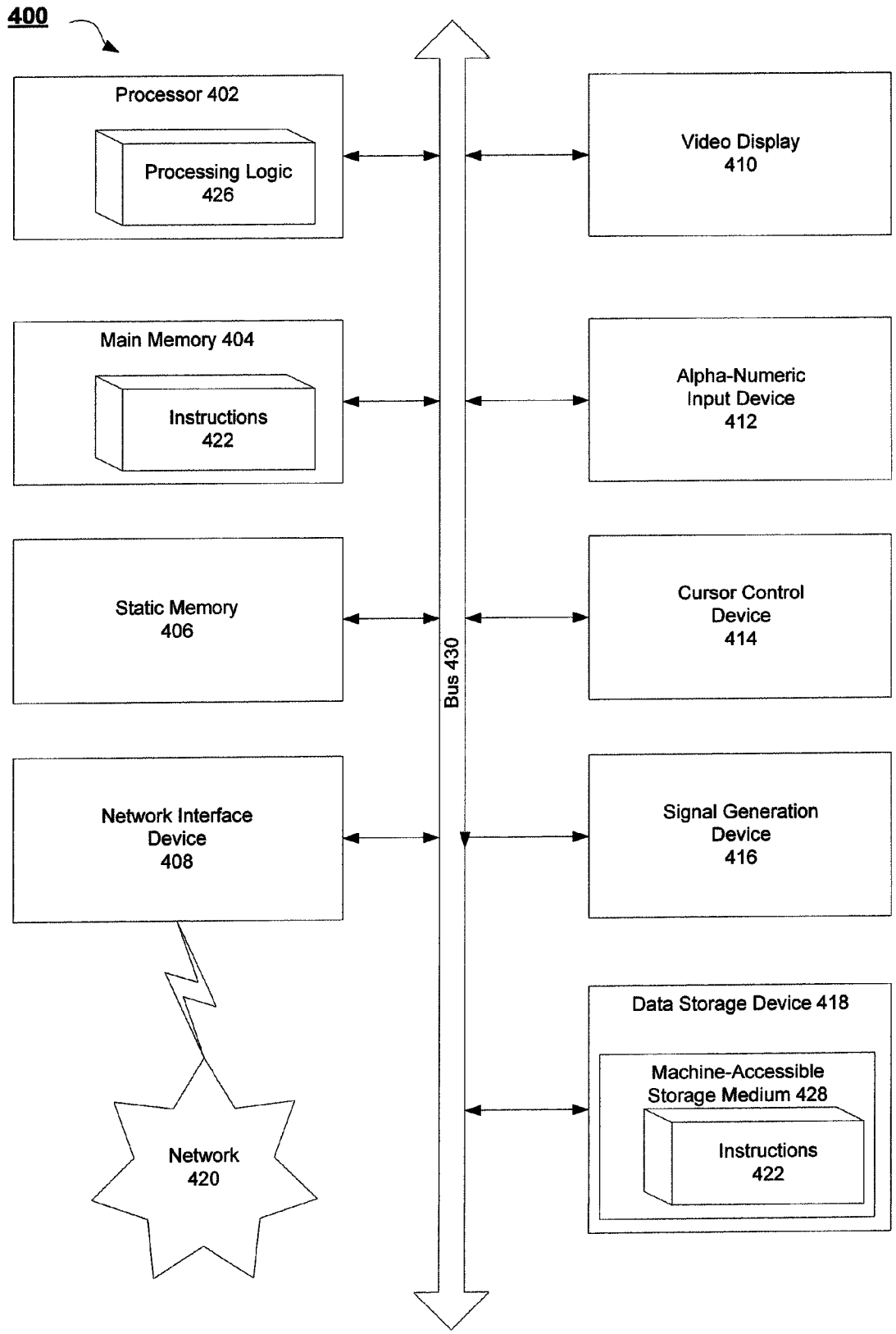
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 for total order messaging for VMs described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method of communicating messages amongst a cluster of virtual machines executing on a host machine using virtual synchrony, comprising:
    receiving, by a hypervisor of a host machine from a virtual membership and message operations (VMMO) component of a sender virtual machine (VM) with membership in the cluster of virtual machines (VMs), a request to reserve a block of memory in a shared memory segment of the host machine;
    reserving, by a central ordering and membership unit (COMU) component of the hypervisor, the block of memory in the shared memory segment;
    providing, by the COMU component, a start address of the reserved block of memory to the sender VM that sent the request, wherein the VMMO component of the sender VM is configured to copy a message from an application executed by the sender VM into the reserved block of memory;
    sending, by the COMU component, a new message available request to all other VMs in the cluster of VMs, wherein the new message available request comprises the start address of the reserved block of memory and a length of the message copied by the sender VM;
    identifying, by the COMU component, each of the all other VMs in the cluster of VMs that has accessed and read the message in the reserved block of memory, wherein each of the all other VMs provides an indication to the COMU component when it has read the message in the reserved block of memory; and in response to receiving the indication, the COMU component decreasing a reference count tracking a total number of VMs that have read the message in the reserved block of memory, wherein the hypervisor further manages membership of the cluster of VMs executing on the host machine and maintains the total ordering of messages such that available messages are read by each of the all other VMs in the cluster of VMs using virtual synchrony of inter-process message passing technique.

2. The method of claim 1, wherein the sender VM indicates to the hypervisor that the message is available at the reserved block of memory for the other VMs to read out after the sender VM copies the message into the reserved block of memory.

3. The method of claim 1, further comprising:
clearing, by the hypervisor, the reserved block of memory for other uses when the reference count drops to zero.

4. The method of claim 1, wherein the COMU component manages the membership of the cluster of VMs executing on the host machine by:
receiving health check information from the cluster of VMs at predetermined time intervals;
removing, from the cluster, any VM in the cluster of VMs that the hypervisor did not receive health check information from during the predetermined time interval; and
sending an update of the cluster membership information to remaining VMs from which health check information has been received.

5. The method of claim 1, wherein the COMU component of the hypervisor manages the cluster membership of virtual machines executing on the host machine.

6. The method of claim 1, wherein the virtual synchrony of inter-process message passing technique is implemented by the VMMO components of the cluster of VMs and the COMU component of the hypervisor.

7. A system for communicating messages amongst a cluster of virtual machines, comprising:
a memory including a shared memory segment;
a host machine communicably coupled to the memory;
a plurality of virtual machines (VMs) executing on the host machine, wherein each of the plurality of VMs is a member of a cluster of VMs and each of the plurality of VMs having an application that communicates between the plurality of VMs using virtual synchrony; and
a hypervisor communicably coupled to the plurality of VMs in order to manage the plurality of VMs under a kernel-based virtualization model, the hypervisor operable to:
receive, from a virtual membership and message operations (VMMO) component of a sender virtual machine (VM) with membership in the cluster of virtual machines (VMs), a request to reserve a block of memory in a shared memory segment of the host machine;
reserve, by a central ordering and membership unit (COMU) component of the hypervisor, the block of memory in the shared memory segment;
provide, by the COMU component, a start address of the reserved block of memory to the sender VM that sent the request, wherein the VMMO component of the sender VM is configured to copy a message from an application executed by the sender VM into the reserved block of memory;

send, by the COMU component, a new message available request to all other VMs in the cluster of VMs, wherein the new message available request comprises the start address of the reserved block of memory and a length of the message copied by the sender VM;

identify, by the COMU component, each of the all other VMs in the cluster of VMs that has accessed and read the message in the reserved block of memory, wherein each of the all other VMs provides an indication to the COMU component when it has read the message in the reserved block of memory; and in response to receiving the indication, the COMU component decreases a reference count tracking a total number of VMs that have read the message in the reserved block of memory, wherein the hypervisor further manages membership of the cluster of VMs executing on the host machine and maintains the total ordering of messages such that available messages are read by each of the all other VMs in the cluster of VMs using virtual synchrony of inter-process message passing technique.

8. The system of claim 7, wherein the sender VM indicates to the hypervisor that the message is available at the reserved block of memory for the other VMs to read out after the sender VM copies the message into the reserved block of memory.

9. The system of claim 7, further comprising: clearing, by the hypervisor, the reserved block of memory for other uses when the reference count drops to zero.

10. The system of claim 7, wherein the COMU component manages the membership of the cluster of VMs executing on the host machine by:
receiving health check information from the cluster of VMs at predetermined time intervals;
removing, from the cluster, any VM in the cluster of VMs that the hypervisor did not receive health check information from during the predetermined time interval; and
sending an update of the cluster membership information to remaining VMs from which health check information has been received.

11. The system of claim 7, wherein the COMU component of the hypervisor manages the cluster membership of virtual machines executing on the host machine.

12. The system of claim 7, wherein the virtual synchrony of inter-process message passing technique is implemented by the VMMO components of the cluster of VMs and the COMU component of the hypervisor.

13. A non-transitory computer readable storage medium comprising data and program instructions stored thereon, when executed by a processor, perform a method of communicating messages amongst a cluster of virtual machines executing on a host machine using virtual synchrony, comprising:
receiving, by a hypervisor of a host machine from a virtual membership and message operations (VMMO) component of a sender virtual machine (VM) with membership in the cluster of virtual machines (VMs), a request to reserve a block of memory in a shared memory segment of the host machine;
reserving, by a central ordering and membership unit (COMU) component of the hypervisor, the block of memory in the shared memory segment;
providing, by the COMU component, a start address of the reserved block of memory to the sender VM that sent the request, wherein the VMMO component of the sender VM is configured to copy a message from an application executed by the sender VM into the reserved block of memory;

sending, by the COMU component, a new message available request to all other VMs in the cluster of VMs, wherein the new message available request comprises the start address of the reserved block of memory and a length of the message copied by the sender VM;

identifying, by the COMU component, each of the all other VMs in the cluster of VMs that has accessed and read the message in the reserved block of memory, wherein each of the all other VMs provides an indication to the COMU component when it has read the message in the reserved block of memory; and in response to receiving the indication, the COMU component decreasing a reference count tracking a total number of VMs that have read the message in the reserved block of memory, wherein the hypervisor further manages membership of the cluster of VMs executing on the host machine and maintains the total ordering of messages such that available messages are read by each of the all other VMs in the cluster of VMs using virtual synchrony of inter-process message passing technique.

14. The non-transitory computer-readable storage medium of claim 13, wherein the sender VM indicates to the hypervisor that the message is available at the reserved block of memory for the other VMs to read out after the sender VM copies the message into the reserved block of memory.

15. The non-transitory computer-readable storage medium of claim 13, wherein the data and program instructions, when executed by the processor, perform further operations comprising: clearing, by the hypervisor, the reserved block of memory for other uses when the reference count drops to zero.

16. The non-transitory computer readable storage medium of claim 13, wherein the COMU component manages the membership of the cluster of VMs executing on the host machine by:

receiving health check information from the cluster of VMs at predetermined time intervals;

removing, from the cluster, any VM in the cluster of VMs that the hypervisor did not receive health check information from during the predetermined time interval; and sending an update of the cluster membership information to remaining VMs from which health check information has been received.

17. The non-transitory computer-readable storage medium of claim 13, wherein the COMU component of the hypervisor manages the cluster membership of virtual machines executing on the host machine.

18. The non-transitory computer-readable storage medium of claim 13, wherein the virtual synchrony of inter-process message passing technique is implemented by the VMMO components of the cluster of VMs and the COMU component of the hypervisor.

* * * * *